(12) United States Patent
Roesner et al.

(10) Patent No.: US 8,054,620 B2
(45) Date of Patent: Nov. 8, 2011

(54) STACKED DRIVES FOR A BLADE SYSTEM

(75) Inventors: Arlen L Roesner, Ft. Collins, CO (US);
Bryan Wiehardt, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 12/432,483

(22) Filed: Apr. 29, 2009

(65) Prior Publication Data

US 2010/0277861 A1    Nov. 4, 2010

(51) Int. Cl.
*H05K 7/16* (2006.01)
(52) U.S. Cl. .................. 361/679.33; 312/223.2
(58) Field of Classification Search ........... 361/679.33–679.39, 724–727; 312/223.1–223.2
See application file for complete search history.

(56) References Cited

U.S. PATENT DOCUMENTS

| | | | | |
|---|---|---|---|---|
| 5,566,383 | A * | 10/1996 | Gildea et al. | 361/679.37 |
| 6,273,273 | B1 * | 8/2001 | Liao | 211/26 |
| 6,318,823 | B1 * | 11/2001 | Liao | 312/223.2 |
| 6,507,487 | B1 * | 1/2003 | Barina et al. | 361/679.33 |
| 6,611,424 | B2 * | 8/2003 | Huang | 361/679.39 |

OTHER PUBLICATIONS

HP pending patent appl. "Computer Including Hot-Pluggable Disk Storage Drives That Are Mounted in an In-Line Arrangement", filied Jan. 28, 2009, appl No. PCT/US2009/030393, 20 pgs.

* cited by examiner

*Primary Examiner* — Jayprakash N Gandhi
*Assistant Examiner* — Ingrid Wright
(74) *Attorney, Agent, or Firm* — Steven L. Webb

(57) ABSTRACT

A blade assembly is disclosed. The blade assembly comprises a printed circuit (PC) board, and a disk drive drawer. The disk drive drawer is configured to move from a closed position into an open position, wherein the disk drive drawer is adjacent to the PC board when in the closed position and is positioned away from the PC board when in the open position. The blade assembly also comprises at least one stack of internal drives attached to the disk drive drawer. Each stack of internal drives comprise: a base bracket attached to the disk drive drawer, at least one drive cage pivotally mounted to the base bracket and configured to rotate between an open position and a closed position. In the closed position the drive cage is parallel with the disk drive drawer and in the open position the drive cage makes an angle a with the disk drive drawer. The drive cage is configured to hold a disk drive. Each stack of internal drives are located inside a blade enclosure when the blade assembly is mounted in the blade enclosure and the disk drive drawer is in the closed position. Each stack of internal drives are located outside the blade enclosure when the blade assembly is mounted in the blade enclosure and the disk drive drawer is in the open position.

11 Claims, 3 Drawing Sheets

STACKED DRIVES FOR A BLADE SYSTEM

BACKGROUND

Many computer blade systems have blades that are physically thick enough to fit multiple disk drives in a stacked configuration within the blade envelope. Some of these blade systems stack drives that are front side accessible in multiple layers but only stack the non-accessible or internal drives in a single layer. Other blade systems may stack the internal drives on top of each other in multiple layers. Unfortunately, when the internal drives are stacked in layers, the lower drives can only be accesses sequentially. The upper drives must be removed before the lower drives may be accessed. Because the internal drives are not front side accessible and can only be accessed sequentially, they are not hot swappable.

DETAILED DESCRIPTION

FIGS. 1-2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1A:
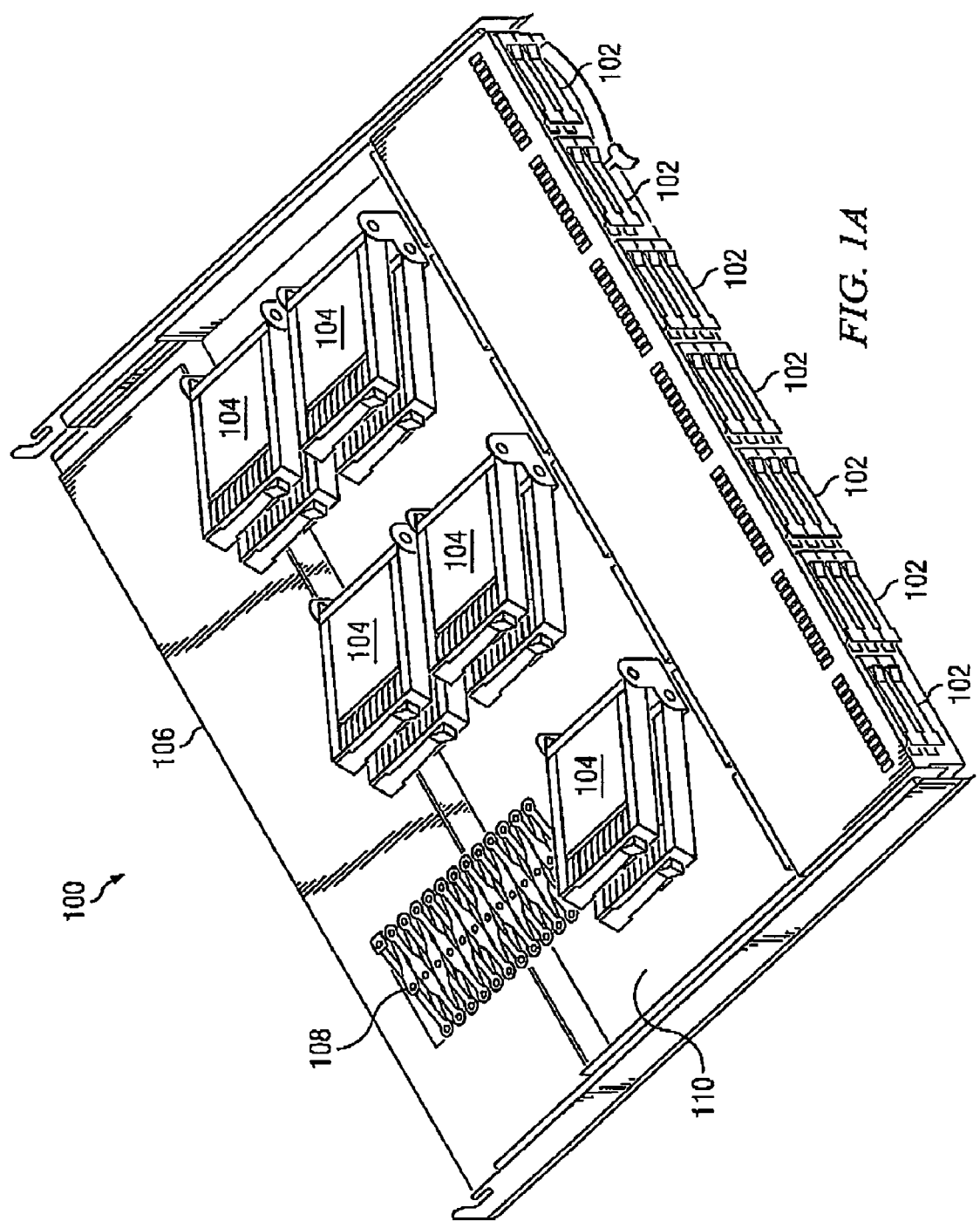
FIG. 1A is an isometric view of a blade assembly 100 in an example embodiment of the invention.

FIG. 1A is an isometric view of a blade assembly 100 in an example embodiment of the invention. Blade assembly 100 comprises multiple stacks of front-side accessible disk drives 102, a plurality of stacks of internal disk drives 104, a printed circuit (PC) board 106, a disk drive drawer 110, and cabling 108. The multiple stacks of front-side accessible disk drives 102 are mounted along the front edge of disk drive drawer 110. The stacks of internal disk drives 104 are mounted on the disk drive drawer 110 behind the stacks of front-side accessible disk drives 102. Cabling 108 connects the disk drive drawer 110 to PC board 106. The back edge of PC board 106 is configured to couple to a blade enclosure (not shown) when blade assembly 100 is installed into the blade enclosure.

Figure 1B:
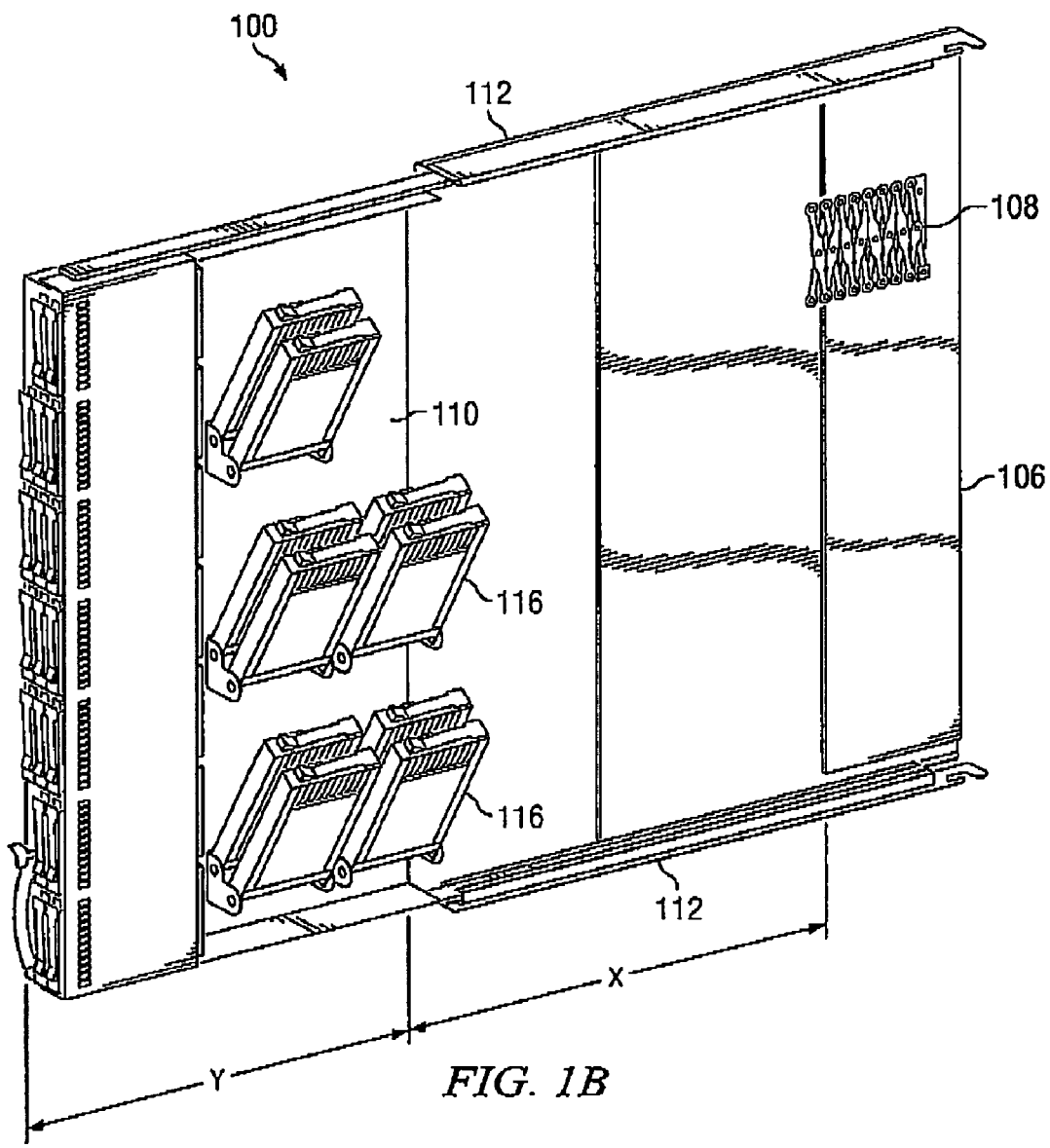
FIG. 1B is an isometric view of a blade assembly 100 in the open position, in an example embodiment of the invention.

Disk drive drawer 110 is configured to move between a closed position and an open position. Disk drive drawer 110 is shown in the closed position in FIG. 1A. FIG. 1B is an isometric view of blade assembly 100 in the open position, in an example embodiment of the invention. In the open position, disk drive drawer 110 has moved away from PC board 106. In this example embodiment of the invention, disk drive drawer 110 is mounted on slides 112 and slides between the open and closed positions. Slides 112 can be any type of sliding mechanism, including ball-bearing slides, a sliding rail mechanism, or the like. For clarity, FIG. 1B shows cabling 108 in the retracted position and unattached to the disk drives. In operation, cabling 108 would be attached to, and make electrical contact with, connectors mounted onto disk drive drawer 110 when disk drive drawer 110 is in the open position.

When blade assembly 100 is installed in a blade enclosure and the disk drive drawer 110 is in the closed position, the stacks of internal disk drives may not be accessible. When blade assembly 100 is installed in a blade enclosure and the disk drive drawer 110 is moved to the open position, access to the stacks of internal disk drives is enabled. Disk drive drawer 110 has a length of Y. When disk drive drawer 110 moves from the closed position into the open position, disk drive drawer 110 moves a distance of X. In one example embodiment of the invention, distance X is at least as big as distance Y. In another embodiment of the invention, distance X is only large enough to get the back edge 116 of the stack of internal disk drives beyond the front edge of the blade enclosure. The stacks of front-side accessible drives can be accessed in both the open and closed position.

Disk drive drawer may be fabricated from sheet metal, plastic, or any other suitably ridged material. Disk drive drawer has a generally flat bottom where the multiple stacks of front-side accessible disk drives 102 and the plurality of stacks of internal disk drives 104 mount. Slides 112 may mount to folded edges at each side of disk drive drawer 110.

Figure 2A:
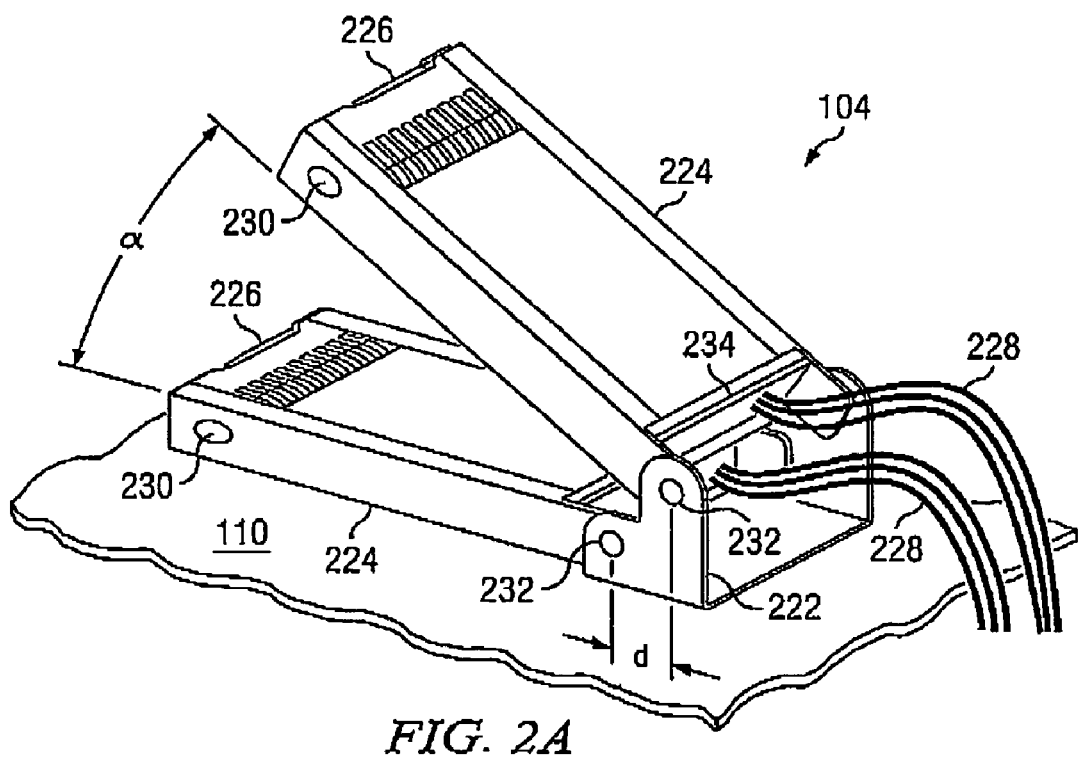
FIG. 2A is an isometric view of one stack of internal disk drives 104, in an example embodiment of the invention.

FIG. 2A is an isometric view of one stack of internal disk drives 104 in an example embodiment of the invention. The stack of internal disk drives 104 comprise two disk drives 226, two drive cages 224, and a base bracket 222. In other embodiments, there may be only one disk drive or there may be more than two disk drives in each stack of internal disk drives 104. Base bracket 222 is attached to disk drive drawer 110. The two drive cages 224 are pivotally mounted onto base bracket 222 and configured to rotate between an open and closed position. In the closed position, both drive cages 224 are parallel with the bottom of disk drive drawer 110, with one drive cage 224 located on top of the other drive cage 224. The two disk drives 226 mount into the two drive cages 224. FIG. 2A shows the top drive 226 and drive cage 224 in the open position, and the lower (or bottom) drive 226 and drive cage 224 in the closed position.

When in an open position, the drive cage will form an angle α with the disk drive drawer 110. Angle α can be any angle between 5 and 145 degrees, but will typically be between 20 and 40 degrees. In one example embodiment of the invention, angle α is 30 degrees. Each drive cage 224 mounts to base bracket 222 at a pivot point 232. The two pivot points 232 may be horizontally displaced by distance d. The horizontal displacement between the two pivot points 232 allows for clearance at the back of the disk drives for when the drive cages rotate into the open position. Distance d may be any value from zero up to many times the disk drive thickness, and may depend on the angle α, the drive thickness, the cabling configuration, and the like. A typical value for distance d is one to two times the thickness of the disk drives mounted into the drive cages.

Figure 2B:
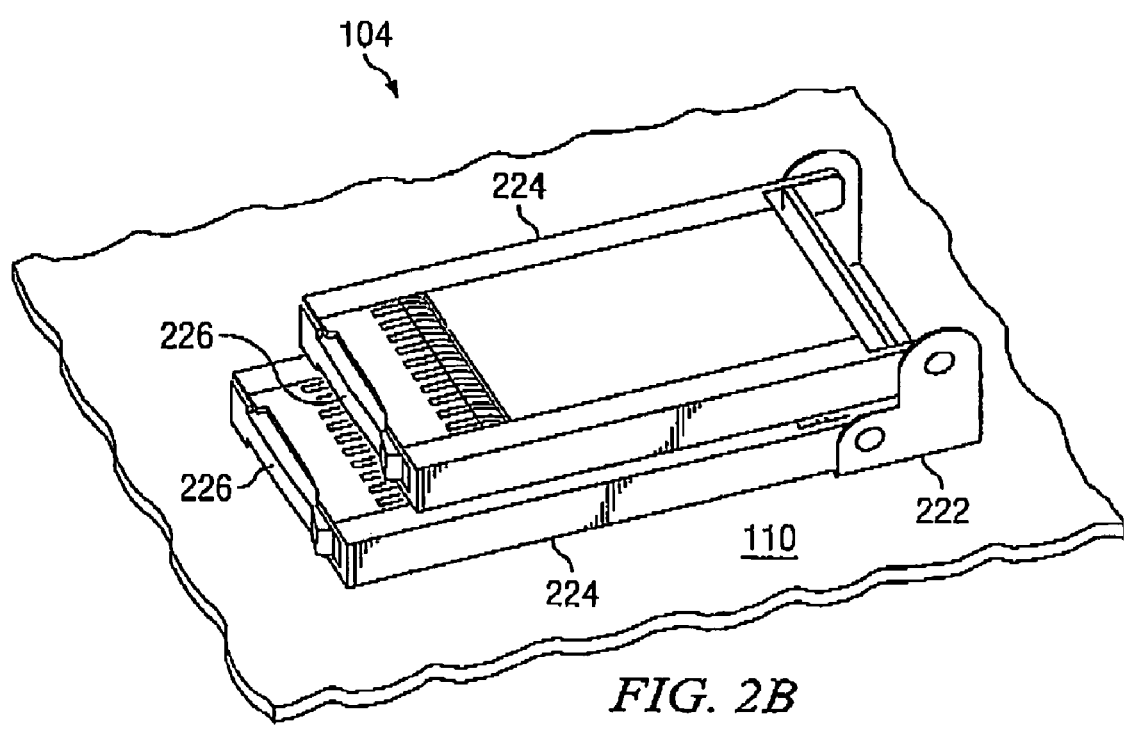
FIG. 2B is another isometric view of one stack of internal disk drives 104, in an example embodiment of the invention.

In one example embodiment of the invention, each of the drive cages will lock in place when in the open and closed positions. Release button 230 can be used to unlock the drive cage and allow it to move between positions. Each drive cage 224 includes printed circuit board (PCB) 234. PCB 234 is a mini-backplane that the disk drive blind-mates to as it slides into drive cage 224. The PCB will have either a SATA or SAS blind-mating connector on the inside surface, while the signal and power cables (228) exit from the outside surface of PCB 234 as shown. The cabling 228 may be routed to connectors mounted on disk drive drawer, or may be routed into cabling 108 directly. A disk drive may be inserted into each drive cage and connected to PCB 234 when the drive cages are in the open position. Disk drives 226 may be hot pluggable. FIG. 2B shows both disk drives 226 in their closed position.

When blade assembly 100 is installed and operating inside a blade enclosure, all the internal disk drives 226 and drive cages 224 will be in the closed position, and disk drive drawer 110 will be in its closed position. In this position, the stacks of internal disk drives 104 will be located inside the blade enclosure. When one of the disk drives 226 needs servicing, the disk drive drawer 110 may be moved into its open position, exposing the stacks of internal disk drives 104. The disk drive that needs servicing can be located. Once located, the drive cages holding the disk drive can be rotated into the open position, and the disk drive can be removed or replaced. When the disk drives are hot swappable, this procedure can be done without powering down the blade assembly 100.

What is claimed is:

1. A blade, comprising:
   a printed circuit (PC) board;
   a disk drive drawer, the disk drive drawer configured to move from a closed position into an open position, wherein the disk drive drawer is adjacent to the PC board when in the closed position and is positioned away from the PC board when in the open position;
   at least one stack of internal drives attached to a first side of the disk drive drawer wherein the at least one stack of internal drives comprise:
      a base bracket attached to the first side of the disk drive drawer;
      at least one drive cage pivotally mounted to the base bracket and configured to rotate between an open position and a closed position, wherein in the closed position the drive cage is parallel with the disk drive drawer and in the open position the drive cage makes an angle α with the disk drive drawer, the drive cage configured to hold a disk drive;
      a second drive cage pivotally mounted to the base bracket and configured to rotate between an open position and a closed position, wherein when both drive cages are in the closed position the second drive cage is parallel with the disk drive drawer and positioned on top of the at least one drive cage, the second drive cage making the angle α with the disk drive drawer when in the open position, the second drive cage configured to hold a disk drive;
   wherein the at least one stack of internal drives are located inside a blade enclosure when the blade is mounted in the blade enclosure and the disk drive drawer is in the closed position, and the at least one stack of internal drives are located outside the blade enclosure when the blade is mounted in the blade enclosure and the disk drive drawer is in the open position; and
   wherein the at least one drive cage is pivotally mounted to the base bracket at a first pivot point and the second drive cage is pivotally mounted to the base bracket at a second pivot point, and the first pivot point is horizontally offset from the second pivot.

2. The blade of claim 1, further comprising:
   multiple stacks of front-side accessible disk drives mounted along a front edge of disk drive drawer wherein each of the multiple stacks of front-side accessible disk drives are accessible when the blade is mounted in a blade enclosure and the disk drive drawer is in the closed position.

3. The blade of claim 1, wherein angle α is between 5 and 145 degrees.

4. The blade of claim 1, wherein a disk drive is mounted in the at least one drive cage.

5. The blade of claim 1, wherein the disk drive drawer is mounted on slides that allows the disk drive drawer to move from the closed position into the open position.

6. The blade of claim 1, further comprising:
   a blade enclosure, wherein the blade is installed in the blade enclosure and the PC board is coupled to, and makes electrical contact with, the blade enclosure.

7. The blade of claim 1, further comprising:
   a locking device mounted onto the at least one drive cage, wherein the least one drive cage locks into the open position.

8. A method for servicing disk drives in a blade enclosure, comprising:
   moving a disk drive drawer of a blade, mounted in the blade enclosure, from a closed position to an open position, thereby exposing at least one stack of internal disk drives mounted on the disk drive drawer;
   rotating at least one drive cage, in the at least one stack of internal disk drives, from a closed position into an open position, wherein in the open position the at least one drive cage make an angle α with the disk drive drawer;
   servicing a disk drive mounted in the at least one drive cage while the drive cage is in the open position;
   wherein there is a second drive cages in the at least one stack of internal disk drives and the second drive cage can be moved from a closed position into an open position, wherein in the open position the second drive cage make the angle a with the disk drive drawer, and wherein the at least one drive cage is rotated at a first pivot point and the second drive cage is rotated at a second pivot point, and the first pivot point is horizontally offset from the second pivot point.

9. The method for servicing disk drives in a blade enclosure of claim 8, wherein the disk drive mounted in the at least one drive cage is serviced without powering down the disk drive drawer.

10. The method for servicing disk drives in a blade enclosure of claim 8, wherein the at least one drive cage is rotated by 30 degrees when moved from the closed position into the open position.

11. A blade, comprising:
    a printed circuit (PC) board;
    a disk drive drawer;
    moving means for moving the disk drive drawer from a closed position into an open position, wherein the disk drive drawer is adjacent to the PC board when in the closed position and is positioned away from the PC board when in the open position;
    cabling means for electrically coupling the disk drive drawer to the PC board;
    at least one stack of internal drives attached to a first side of the disk drive drawer wherein the at least one stack of internal drives comprise:
       a mounting means for pivotally mounting at least one drive cage to the disk drive drawer, the mounting means configured to rotate the at least one drive cage between an open position and a closed position, wherein in the, closed position the drive cage is parallel with the disk drive drawer, and in the open position the drive cage makes an angle α with the disk drive drawer, the drive cage configured to hold a disk drive;
       a second drive cage, the mounting means configured to rotate the second drive cage between an open position and a closed position, wherein when both drive cages are in the closed position the second drive cage is parallel with the disk drive drawer and positioned on top of the at least one drive cage, the second drive cage making the angle a with the disk drive drawer when in the open position, the second drive cage configured to hold a disk drive and wherein the at least one drive cage is rotated at a first pivot point and the second drive cage is rotated at a second pivot point, and the first pivot point is horizontally offset from the second pivot point;

wherein the at least one stack of internal drives are located inside a blade enclosure when the blade is mounted in the blade enclosure and the disk drive drawer is in the closed position, and the at least one stack of internal drives are located outside the blade enclosure when the blade is mounted in the blade enclosure and the disk drive drawer is in the open position.

* * * * *

UNITED STATES PATENT AND TRADEMARK OFFICE
CERTIFICATE OF CORRECTION

PATENT NO.        : 8,054,620 B2                                    Page 1 of 1
APPLICATION NO.   : 12/432483
DATED             : November 8, 2011
INVENTOR(S)       : Arlen L Roesner et al.

It is certified that error appears in the above-identified patent and that said Letters Patent is hereby corrected as shown below:

In column 4, line 12, in Claim 7, delete "the least one" and insert -- the at least one --, therefor.

In column 4, line 30, in Claim 8, delete "angle a" and insert -- angle $\alpha$ --, therefor.

In column 4, line 60, in Claim 11, delete "the," and insert -- the --, therefor.

In column 5, line 4, in Claim 11, delete "angle a" and insert -- angle $\alpha$ --, therefor.

Signed and Sealed this
Thirty-first Day of July, 2012

David J. Kappos
*Director of the United States Patent and Trademark Office*